United States Patent
Oishi et al.

(10) Patent No.: US 6,826,773 B2
(45) Date of Patent: Nov. 30, 2004

(54) DISC CARTRIDGE

(75) Inventors: Kengo Oishi, Kanagawa (JP); Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 92 days.

(21) Appl. No.: 10/098,147

(22) Filed: Mar. 15, 2002

(65) Prior Publication Data

US 2002/0131361 A1 Sep. 19, 2002

(30) Foreign Application Priority Data

Mar. 16, 2001 (JP) ........................................ 2001-076949

(51) Int. Cl.[7] ............................................. G11B 23/03
(52) U.S. Cl. ..................................................... 720/739
(58) Field of Search .......................... 369/291; 360/132, 360/133

(56) References Cited

U.S. PATENT DOCUMENTS

| | | | | |
|---|---|---|---|---|
| RE32,876 E | * | 2/1989 | Wakabayashi et al. | 360/133 |
| 6,178,067 B1 | * | 1/2001 | Schick et al. | 360/133 |
| 6,256,168 B1 | * | 7/2001 | Hales et al. | 360/133 |
| 6,298,034 B1 | * | 10/2001 | Hashimoto | 369/291 |
| 6,459,677 B1 | * | 10/2002 | Shiomi et al. | 369/291 |
| 6,590,858 B2 | * | 7/2003 | Inoue | 369/291 |

FOREIGN PATENT DOCUMENTS

| | | |
|---|---|---|
| JP | 11-31253 | 11/1999 |
| JP | 2000-30394 | 1/2000 |
| JP | 2000-30395 | 1/2000 |
| JP | 2000-30396 | 1/2000 |
| JP | 2000-30397 | 1/2000 |
| JP | 2000-30398 | 1/2000 |
| JP | 2000-30399 | 1/2000 |
| JP | 2000-90626 | 3/2000 |
| JP | 2000-90627 | 3/2000 |
| JP | 2000-90628 | 3/2000 |

* cited by examiner

*Primary Examiner*—Tianjie Chen
(74) *Attorney, Agent, or Firm*—Sughrue Mion, PLLC (57) ABSTRACT

In order to prevent that the opening is opened inadvertently, a disc cartridge having a shutter portion which can open and close an opening for access to a disc-shaped disc medium, which opening is formed in at least one surface of a case which rotatably accommodates the disc medium, wherein two groove portions are provided at wall surfaces of the case, and an operating portion of a lock mechanism for the shutter potion is provided in one of the groove portions, and an activating portion for opening and closing operation of the shutter portion is provided in another of the groove portions, is provided.

8 Claims, 8 Drawing Sheets

DISC CARTRIDGE

BACKGROUND OF THE INVENTION

1. Field of the Invention

The present invention relates to a disc cartridge which rotatably accommodates a disc-shaped disc medium used as a recording/playback medium of an information processing device or the like, and which prevents entry of dust or the like.

2. Description of the Related Art

A disc-shaped disc medium, such as an optical disc, a magneto-optical disc, or the like, is used, for example, as a portable recording/playback medium for a computer. When recording or playback of the disc medium is carried out, laser beam is illuminated onto the recording surface while the disc medium is rotated in a state of being loaded in a drive device. In this way, recording of information is carried out by pit formation or phase changes or magnetization or the like due to decomposition of the dye layers of the recording surface, or recorded information is played back on the basis of differences in the reflectivity or the polarizing angle of the laser beam.

Further, in such disc media, shortening of the wavelength of the laser beam which is illuminated onto the recording surface has been proposed in order to increase the recording capacity. When recording or playback of information is carried out by using this short-wavelength laser beam (e.g., a blue-violet color laser), in order to suppress the attenuation of the laser beam due to the cover layer which protects the recording surface of the disc medium, the cover layer must be made thin. By making the cover layer thin in this way, the diameter of the laser beam at the surface of the cover layer (the surface which is exposed to the exterior) decreases, and it is not possible to ignore the effects of dust and the like adhering to the surface of the cover layer.

Thus, disc cartridges, which accommodate a disc medium in a case and prevent adhesion of dust or the like onto the disc medium, are employed. Such a disc cartridge is formed to include an opening, which is for exposing to the exterior a center hole portion (center core portion) provided at the central portion of the disc medium and a portion of the recording surface (the cover layer), and a shutter member which opens and closes this opening.

In this way, in the disc cartridge, generally, by closing the opening by the shutter member, entry of dust or the like into the disc cartridge, i.e., adhesion of dust or the like onto the disc medium, is prevented, and by opening the opening as the disc cartridge is loaded into the drive device, the center hole portion (the center core portion) can be held by a rotation spindle shaft, and the laser head can approach the recording surface (laser beam can be illuminated).

Further, in such a disc cartridge, in the aforementioned state in which the opening is open, there is the need to ensure a space for accommodating the shutter member. Also, it is desired to make the disc cartridge compact and thinner. Thus, to aim for compactness and thinness, a disc cartridge in which the shutter member is divided in two has been disclosed in Japanese Patent Application Laid-Open (JP-A) No. 2000-30394 and the like.

In the disc cartridge of JP-A 2000-30394, the entire opening is closed in a state in which the end surfaces of a first shutter member, which mainly closes the opening portion for laser head insertion (approach), and a second shutter member, which mainly closes the opening portion for insertion of the rotation spindle shaft, abut one another. In a opening state of the opening, the first shutter member and the second shutter member rotate in different directions while above mentioned abut surfaces are being apart each other. The first shutter member and the second shutter member are accommodated within accommodating spaces which substantially correspond to the projection surface area of the disc-shaped disc medium. Thus, this disc cartridge aims for a reduction in size and a reduction in thickness, while preventing adhesion of dust and the like onto the disc medium.

At one of wall surfaces of this disc cartridge, a guide groove for guiding at a time of inserting the disc cartridge into the drive device is provided in parallel to the inserting direction. A lock releasing lever of a lock mechanism which regulates (stops) movement of the shutter member, and an activating member which moves the shutter member to an opening direction protrude in the guide groove. A convex portion, which engages with the lock releasing lever and the activating member, protrudes from the drive device.

Accordingly, when such disc cartridge is inserted into the drive device, the convex portion enters in the guide groove in accompany with the insertion of the disc cartridge into the drive device. First, the convex portion abuts the lock releasing lever and a lock state of the shutter member is released. Then, when the disc cartridge is inserted further into the drive device, the convex portion abuts the activating member and the shutter member is moved in the opening direction. In this way, the opening is opened and access to the disc media becomes possible.

In this way mentioned above, the shutter member which opens and closes the opening of the disc cartridge is moved by operating the lock releasing lever and the activating member, which are disposed at the one side wall of the disc cartridge. However, in this case, because of means which can move the shutter member so as to open the opening being provided at one side wall, there is a problem that countermeasure against the shutter member being inadvertently opened does not suffice.

SUMMARY OF THE INVENTION

The object of the present invention is to provide a disc cartridge which prevents a shutter portion from being opened and closed inadvertently.

In order to achieve the above object, the disc cartridge of a first aspect of the present invention is a disc cartridge having a shutter portion which can open and close an opening for access to a disc-shaped disc medium, the opening being formed in at least one surface of a case which rotatably accommodates the disc medium, wherein two groove portions are provided at wall surfaces of the case, and an operating portion of a lock mechanism for the shutter potion is provided in one of the groove portions, and an activating portion for opening and closing operation of the shutter portion is provided in another of the groove portions.

The disc cartridge of a second aspect of the present invention is a disc cartridge having a shutter portion which can open and close an opening for access to a disc-shaped disc medium, the opening being formed in at least one surface of a case which rotatably accommodates the disc medium, the disc cartridge comprising: a first groove portion which is formed on one of wall surfaces of the case; a second groove portion which is formed on another of the wall surfaces of the case; a lock portion which regulates movement of the shutter portion; and an activating portion for moving the shutter portion, wherein the activating portion protrudes from the first groove, and an operating portion of the lock portion protrudes from the second groove.

In the disc cartridge of a third aspect of the present invention according to the second aspect, a protruding portion which protrudes from the second groove is formed at one end portion of the operating portion, and an engaging portion for engaging with the shutter portion is formed at another end portion of the operating portion.

In the disc cartridge of a fourth aspect of the present invention according to the third aspect, the shutter portion comprises a first shutter member and a second shutter member, and the activating portion is provided at an one end portion of the first shutter member and an engaged portion which is engaged with the engaging portion of the lock portion is provided at another end of the first shutter member.

In the disc cartridge of a fifth aspect of the present invention according to the second aspect, the first groove portion and the second groove portion are formed respectively at side walls, which oppose each other, of the case.

In order to open the opening intentionally, the operating portion of the lock mechanism and the activating portion for opening and closing operation of the shutter portion are operated at the same time. However, in the present invention, the operating portion and the activating portion are provided in the respective different groove portions, namely, operating of the shutter member is not facile. Accordingly, it can be prevent that the opening is opened inadvertently.

It is preferable that the case is formed by joining a top shell and a bottom shell, and the shutter portion is provided at an outer side of the case. Further, it is preferable that a covering plate portion, in which an opening corresponding to the above mentioned opening is formed, is provided, and the shutter portion is movably accommodated between the covering plate portion and the case.

Further, it is preferable that the lock mechanism (the lock portion) is structured such that a center portion of the operating portion of lock mechanism is rotatably supported, a protruding portion provided at one end of the operating portion protrudes in the one of the groove portions and an engaging portion provided at another end of the is engaged with a cut out portion formed at the shutter portion. In this way, the lock mechanism can be operated preferably. Also, because the cut out portion is a shutter window portion forming a part of the opening, due to utilizing this window portion, it becomes not necessary that another engaged portion for engaging with the engaging portion of the operating portion of the lock mechanism is provided at the shutter portion. Accordingly, the cost does not increase.

DESCRIPTION OF THE PREFERRED EMBODIMENTS

Hereinafter, a disc cartridge 10 relating to the embodiments of the present invention will be described in detail on the basis of the embodiments illustrated in FIGS. 1 through 7. Note that, in FIGS. 1 through 7, when arrow FR, arrow RE, arrow UP, arrow LO, arrow LE and arrow RI are used, they indicate, respectively, the front direction (the loading direction), the rear direction, the upward direction, the downward direction, the leftward direction, and the rightward direction of the disc cartridge 10 while looking in the direction of loading (inserting) the disc cartridge 10 into the drive device. Hereinafter, when the up-down, front-rear, left-right directions are indicated, they correspond to the directions of the respective arrows.

Further, these respective directions are for convenience of explanation, and are of course not intended to limit the directions at the time of using the disc cartridge 10. Accordingly, for example, the disc cartridge 10 may be disposed horizontally or may be disposed vertically at the time of use thereof.

Figure 1A:
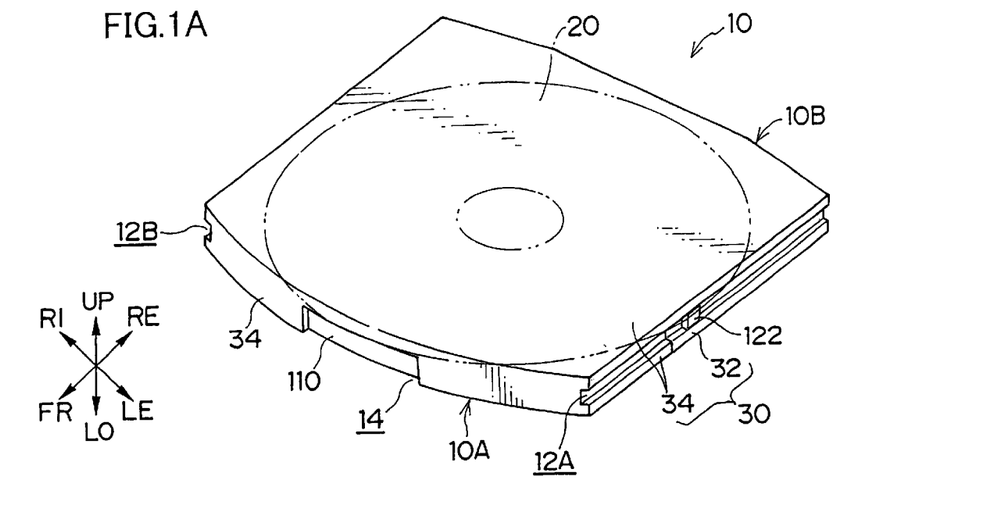
FIG. 1A is a perspective view, as seen from the front and above at an angle, of a disc cartridge relating to the present invention.
Figure 1B:
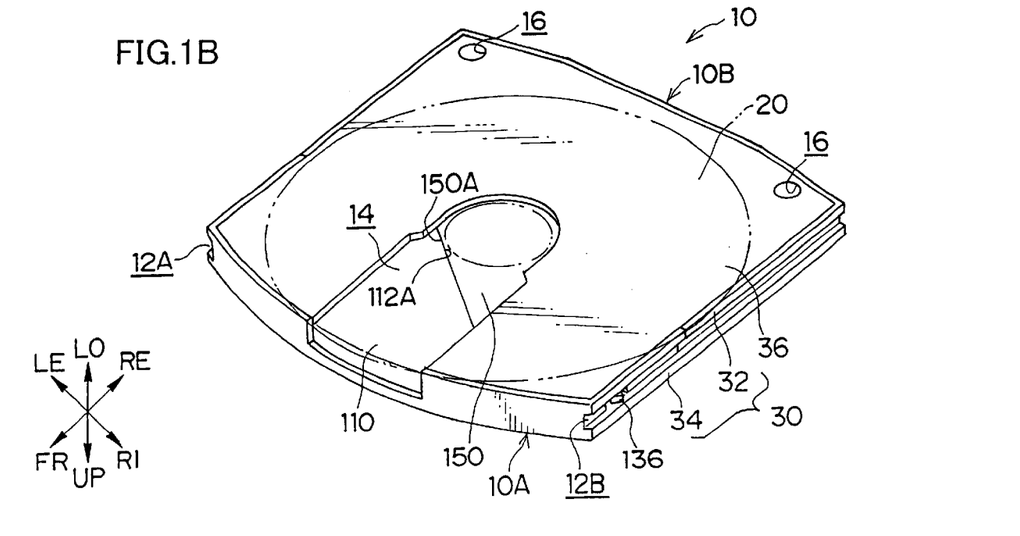
FIG. 1B is a perspective view, as seen from the front and below at an angle, of the disc cartridge relating to the present invention.

First, a summary of the disc cartridge 10 will be given. In FIG. 1A, the exterior, when the disc cartridge 10 is viewed from the front and above at an angle, is illustrated in a perspective view. In FIG. 1B, the exterior, when the disc cartridge 10 is viewed from the front and below at an angle, is illustrated in a perspective view. As shown in these figures, the disc cartridge 10 is formed on the whole in a flat case shape. A disc-shaped disc media 20, which serves as an information recording/playback medium and which will be described later, is accommodated within the disc cartridge 10.

The disc cartridge 10 is formed in a polygonal configuration in which a front end portion 10A is curved in a circular-arc shape, and left and right corner portions of a rear end portion 10B are cut-out due to required functions thereof. Further, the front-back dimension of the disc cartridge 10 is slightly larger than the left-right dimension thereof. For these reasons, the disc cartridge 10 is structured such that the loading direction into a drive device (not shown) can be easily recognized from the external appearance, and loading into the drive device from an incorrect direction is not permitted.

A first guide groove 12A and a second guide groove 12B are provided at the left and right side surfaces of the disc cartridge 10, respectively, and are for guiding at the time of loading the disc cartridge 10 into a drive device. A shutter engaging portion 122, which will be described later, projects at the first guide groove 12A. A lock releasing lever 136, which will be described later, projects at the second guide groove 12B.

An opening 14 is provided from the central portion of the bottom surface of the disc cartridge 10 to the left-right direction central portion of the front wall portion of the front end portion 10A. The opening 14 is for access to the disc medium 20 when the disc medium 20 is used. Namely, when the disc medium 20 is used, a rotation spindle shaft and a recording/playback head (e.g., a laser head) of the drive device are inserted and made to approach from the opening 14. When the disc medium 20 is not being used, the opening 14 is closed by a first shutter member 110 and a second shutter member 150, which will be described later and which are accommodated within the disc cartridge 10, such that entry of dust and the like into the disc cartridge 10 is prohibited.

Two holes 16 for position regulation are formed in a vicinity of the rear end portion 10B of the bottom surface of the disc cartridge 10. The holes 16 for position regulation are for regulating (detecting) the position of the disc cartridge 10 within the drive device.

The disc cartridge 10 is loaded into the drive device to the front (the direction of arrow FR) while being guided into the drive device at the first guide groove 12A and the second guide groove 12B. Accompanying this loading, the opening 14 is opened, and the disc cartridge 10 is set, by the holes 16 for position regulation, in a position-detected and positioned state in the drive device. Within the drive device, recording of information onto the disc medium 20 or playback of information recorded on the disc medium 20 is carried out.

Figure 2:
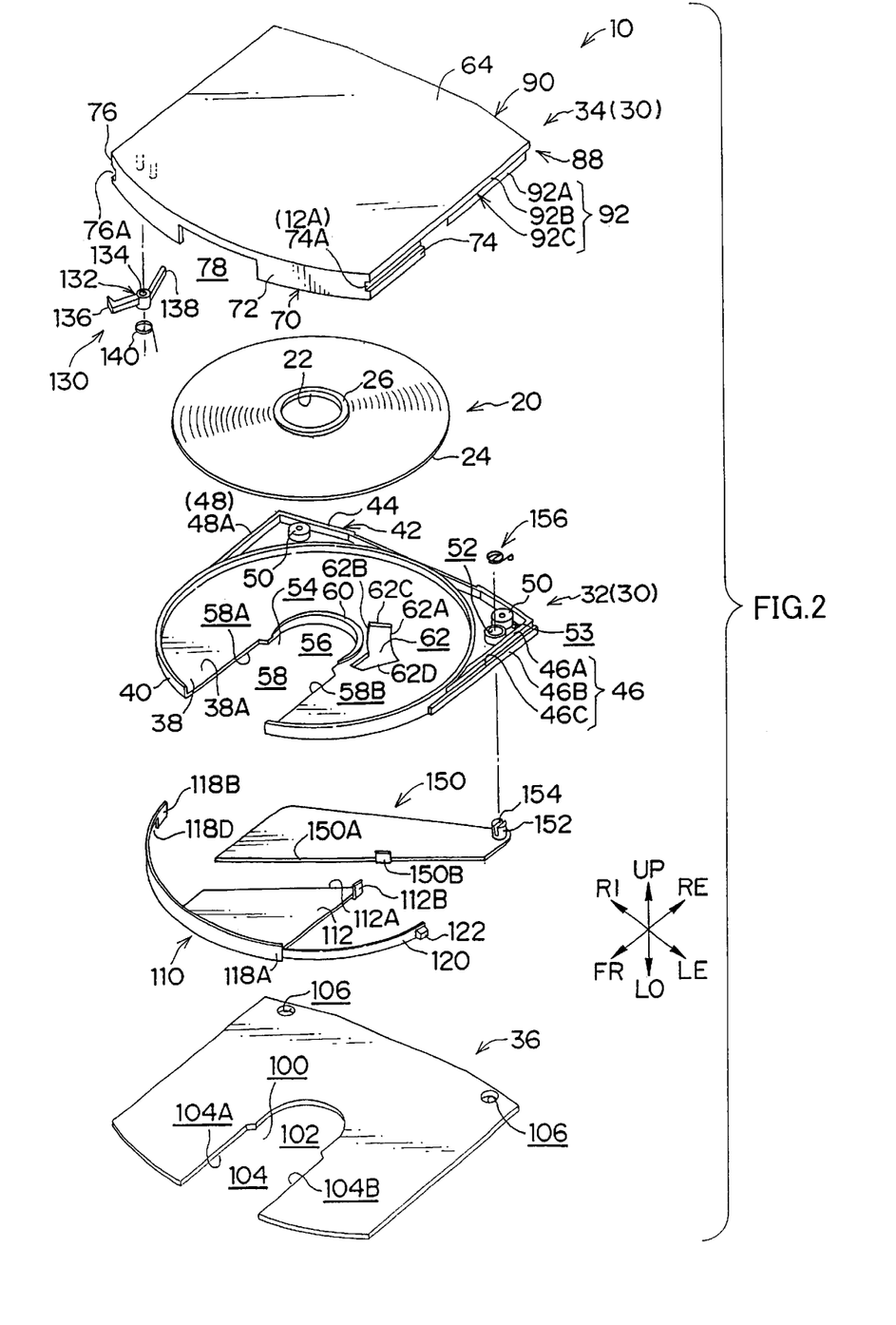
FIG. 2 is an exploded perspective view, as seen from above at an angle, of the disc cartridge relating to the present invention.
Figure 3:
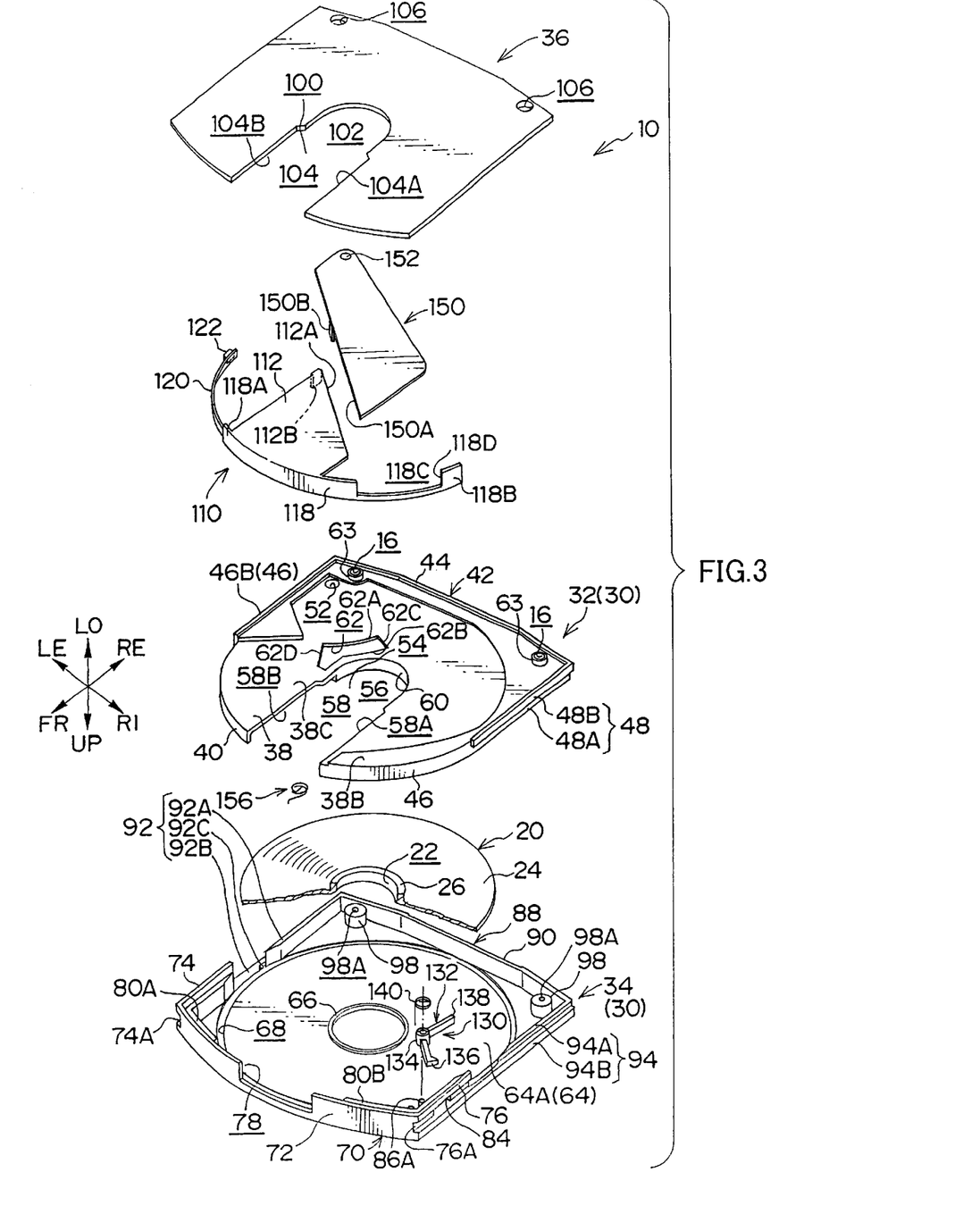
FIG. 3 is an exploded perspective view, as seen from below at an angle, of the disc cartridge relating to the present invention.

Next, to describe the detailed structure of the disc cartridge 10, as shown in the exploded perspective views of FIGS. 2 and 3, the disc cartridge 10 is provided with the disc medium 20. The disc medium 20 is formed in a disc shape having a center hole 22 in the central portion thereof. The recording surface, which is formed on a bottom surface 24 of the disc medium 20, is covered and protected by a cover layer (both the recording surface and the cover layer are not shown in the figures). An annular center core portion 26 is mounted by adhesion or the like to the center hole 22 of the disc medium 20. The center core portion 26 is engaged and held or is suctioned and held by the distal end portion of the rotation spindle shaft of the drive device.

The disc medium 20 is accommodated within a case 30. The case 30 is formed by the joining of a base plate portion 32 which serves as a bottom shell and a top surface plate portion 34 which serves as a top shell. The lower side of the case 30 (the base plate portion 32) is covered by a bottom surface plate portion 36 which serves as a covering plate portion. The first shutter member 110 and the second shutter member 150 are accommodated between the case 30 and the bottom surface plate portion 36.

The base plate portion 32 is provided with a base bottom portion 38 which is formed by a thin plate, and whose front portion is formed in a semicircular shape, and whose rear portion is formed in a substantially rectangular shape which circumscribes the remaining semicircular portion. At the peripheral edge of the front semicircular portion and the rear semicircular portion of the base bottom portion 38, a tubular wall 40, which is coaxial with and has the same diameter as the circular portion, stands upright, extending upwardly by a predetermined height. Note that the inner diameter of this tubular wall 40 is slightly larger than the outer diameter of the disc medium 20.

A peripheral wall 42, which is substantially U-shaped in plan view, stands upright at the outer peripheral edge of the substantially rectangular rear portion of the base bottom portion 38, so as to enclose substantially the rear half of the tubular wall 40. A rear wall 44 of the peripheral wall 42 is formed in a bent line configuration in which the left and right corner portions are slightly folded over toward the front as seen in plan view. The rear wall 44 corresponds to the rear end portion 10B of the disc cartridge 10. The height of the rear wall 44 from a top surface 38A of the base bottom portion 38 is at a lower level than the tubular wall 40, and the rear wall 44 projects further downward than a bottom surface 38B of the base bottom portion 38 (see FIGS. 2 and 3).

A left wall 46 of the peripheral wall 42 is formed by a left inner wall 46A and a left outer wall 46B. The outer surface of the left inner wall 46A is formed along a line which is tangent to the tubular wall 40 and parallel to the front-back direction. The front end surface of the left inner wall 46A contacts the outer peripheral surface of the tubular wall 40 along this outer peripheral surface. The left outer wall 46B is provided at the outer side (the left side) of the left inner wall 46A and extends slightly further forward than the front-back direction central portion of the tubular wall 40. The left inner wall 46A stands upright only at the top surface 38A side of the base bottom portion 38, and is at the same heightwise level as the rear wall 44. The left outer wall 46B is, at the top surface 38A side, at a lower level than the left inner wall 46A, and at the bottom surface 38B side, is at the same heightwise level as the rear wall 44. A thin groove 46C, which opens upwardly, is formed between, on the one hand, the left outer wall 46B, and on the other hand, the left inner wall 46A and the tubular wall 40. A right wall 48 of the peripheral wall 42 has a similar structure as that of the left wall 46, but no thin groove is formed at the right wall 48 side.

In this way, at the top surface 38A side of the base bottom portion 38, the peripheral wall 42 forms a substantial U shape, as seen in plan view, in which the rear wall 44 and the left inner wall 46A and a right inner wall 48A are at the same heightwise level, and is a region of abutment with a peripheral wall 88 of the top surface plate portion 34. At the bottom surface 38B side of the base bottom portion 38, the peripheral wall 42 forms a substantial U shape, as seen in plan view, in which the rear wall 44 and the left outer wall 46B and a right outer wall 48B are at the same heightwise level, and is a region of fitting together with the bottom surface plate portion 36.

The outer surface (left side surface) of the left inner wall 46A is the bottom surface lower portion of the rear portion of the first guide groove 12A of the disc cartridge 10. The top end surface of the left outer wall 46B is the bottom side wall surface of the rear portion of the first guide groove 12A. The outer surface (right side surface) of the right inner wall 48A is the bottom surface lower portion of the rear portion of the second guide groove 12B of the disc cartridge 10. The top end surface of the right outer wall 48B is the lower side wall surface of the rear portion of the second guide groove 12B.

A tubular projection 50 stands upright at each of the rear end corner portions of the top surface 38A of the base bottom portion 38, between the tubular wall 40 and the peripheral wall 42. The tubular projection 50 is at the same heightwise level as the rear wall 44 of the peripheral wall 42. Although not shown, a through-hole and a conical screw receiving portion, which corresponds to the head portion of a screw for fixing, are formed at the interior of the tubular projection 50.

A tubular shutter shaft hole 52 is provided in the vicinity of the left side tubular projection 50, and is for rotatably supporting the second shutter member 150. A spring holding portion 53 is provided in a vicinity of the shutter shaft hole 52, and is for holding one end of a torsion spring 156 which will be described later.

An opening 54, which forms the opening 14 of the disc cartridge 10, is formed in the base plate portion 32. The opening 54 is formed by a circular hub hole 56 and a substantially rectangular window portion 58 for a recording/playback head being connected together. The hub hole 56 has a larger diameter than the outer diameter of the center core portion 26 of the disc medium 20. The window portion 58 for a recording/playback head is formed by cutting out the base bottom portion 38 symmetrically to the left and right along the radial direction of the semicircular portion of the base bottom portion 38 until the outer peripheral front end portion thereof, and cutting out the tubular wall 40 thereat as well. The widthwise dimension in the left-right direction of the window portion 58 for a recording/playback head is formed to be large at both the left and right so as to be greater than the diameter of the hub hole 56, except in a vicinity of the portion of connection with the hub hole 56, therefore, insertion of a large-sized recording/playback head is possible.

A rib 60, whose top surface 38A side is thick, is provided at the peripheral edge of the hub hole 56 of the base bottom portion 38. A shutter guiding hole 62 is provided in a vicinity of the left side of the hub hole 56 of the base bottom portion 38. As shown in the figures, the shutter guiding hole 62 is formed in a configuration in which one portion of a substantially fan-shaped front side, which is enclosed by two circular arcs 62A, 62B which are formed concentrically with the axis of the shutter shaft hole 52 and by two straight lines 62C, 62D which are formed radially so as to pass through the axial center of the shutter shaft hole 52, extends further toward the front in a substantially rectangular form.

As shown in FIG. 3, a substantially circular concave portion 38C is formed in the bottom surface 38B of the base plate portion 32 (the base bottom portion 38), and is for forming an operation and accommodation space for a shutter main body 112 of the first shutter member 110 and the second shutter member 150. Namely, at the bottom surface 38B side of the base plate portion 32, the bottom end surface of the peripheral wall 42 projects downwardly, with the bottom surface 38B of the base bottom portion 38 as a reference, such that the concave portion 38C is recessed upwardly.

In this way, by fitting the bottom surface plate portion 36 together with the peripheral wall 42 in a state in which the bottom surface plate portion 36 abuts the bottom surface 38B, a flat space is formed between the bottom surface plate portion 36 and the concave portion 38C. Further, at the bottom surface 38B of the base bottom portion 38, at positions corresponding to the tubular projections 50, tubular projections 63, which communicate coaxially with the interiors of the tubular projections 50, stand erect, directed downwardly, such that screws or tools can be inserted therein. The outer peripheries of the tubular projections 63 are used for positioning the bottom surface plate portion 36. The interiors of the tubular projections 63 are the holes 16 for position regulation of the disc cartridge 10.

The disc medium 20 is accommodated at the inner side of the tubular wall 40 of the above-described base plate portion 32. The disc medium 20 is placed on the rib 60 in a state in which the center core portion 26 of the disc medium 20 is inserted into the hub hole 56. Contact of the disc medium 20 with the top surface 38A of the base bottom portion 38 and the tubular wall 40 is prevented. In this state, the top of the base plate portion 32 is covered by the top surface plate portion 34.

The top surface plate portion 34 is provided with a flat plate portion 64 which is formed in a polygonal shape, and whose rectangular, plate-shaped front end portion is curved in a circular-arc shape, and whose left and right corner portions of the rear end portion are cut-out. The front-back dimension of the flat plate portion 64 is slightly greater than the left-right dimension thereof. An annular projection 66, which corresponds to the rib 60 of the base plate portion 32, is provided at the central portion of a bottom surface 64A of the flat plate portion 64. The annular projection 66 is for preventing the disc medium 20 from contacting the bottom surface 64A.

An annular groove 68, which corresponds to the tubular wall 40 of the base plate portion 32, is formed in the bottom surface 64A of the flat plate portion 64. The annular groove 68 is formed on the whole such that the tubular wall 40 can be inserted therein. The outer diameter of the front portion of the annular groove 68 is slightly greater (the width is wider) than a length between the left outer wall 46B and the right outer wall 48B of the base plate portion 32. As well as the annular wall 40, a circular-arc-shaped guide wall portion 118 of the first shutter member 110 can be inserted into the annular groove 68.

At the outer periphery of the front portion of the flat plate portion 64, an outer wall 70, which is formed in a substantial U shape as seen in plan view, stands erect, directed downwardly, so as to surround the front half of the annular groove 68. The outer wall 70 is of a height which corresponds to the entire thickness of the disc cartridge 10, and is formed by a front wall 72, a left wall 74, and a right wall 76.

The front wall 72 is curved so as to correspond to the curved configuration of the front end of the flat plate portion 64. A rectangular window portion 78, which is cut out such that the lower side is open by a predetermined length, is formed in the left-right direction central portion of the front wall 72. The window portion 78 is for forming the opening 14 of the disc cartridge 10. Namely, the left-right direction widthwise dimension of the window portion 78 corresponds to the widthwise dimension of the window portion 58 for a recording/playback head of the base plate portion 32, and the window portion 78 forms a portion of the opening 14 of the disc cartridge 10. Note that the front wall 72 forms the front end portion 10A of the disc cartridge 10.

The left wall 74 and the right wall 76 extend rearward from the left and right end portions of the front wall 72, respectively. The positions, of the left wall 74 and the right wall 76, which correspond to the front end portions of the left outer wall 46B and the right outer wall 48B of the base plate portion 32, are the rear end portions. Namely, in the assembled state, the respective bottom portions of the rear end surfaces of the left wall 74 and the right wall 76 of the top surface plate portion 34, and the front end surfaces of the left outer wall 46B and the right outer wall 48B of the base plate portion 32, abut one another.

Inner walls 80A and 80B, which are formed along the inner surfaces of the left and right corner portions of the outer wall 70, are provided at the inner side of the outer wall 70. The bottom end surfaces of the inner walls 80A, 80B are positioned slightly above the bottom end surface of the outer wall 70 (are recessed toward the inner side of the disc cartridge 10), and form surfaces for abutment with the top surface of the bottom surface plate portion 36 which is fit together with the outer wall 70.

A lateral groove 74A is formed in the outer surface of the left wall 74 of the outer wall 70 along the front-back direction thereof. The bottom portion of the lateral groove 74A reaches the inner wall 80A. This lateral groove 74A structures a front portion of the first guide groove 12A of the disc cartridge 10. On the other hand, the right wall 76 of the outer wall 70 is formed similarly to the left wall 74, and forms the front portion of the second guide groove 12B. A lateral groove 76A, whose bottom portion reaches the inner wall 80B, is formed in the right wall 76.

Further, a lock releasing lever hole 84, which communicates the bottom portion of the lateral groove 76A and the inner side of the inner wall 80B, is provided in the inner wall 80B. In the bottom surface 64A of the flat plate portion 64 in the vicinity of the lock releasing lever hole 84, a protrusion 86A for rotatably supporting a lock lever 132, which will be described later, and a protrusion 86B for holding one end of the torsion spring 140, are provided. At the left wall 74 (the inner wall 80A) side, the lock releasing lever hole and the protrusion are not provided.

A peripheral wall 88, which corresponds to the peripheral wall 42 of the base plate portion 32, stands erect, directed downward, at the outer periphery of the flat plate portion 64, further toward the rear than the outer wall 70. Namely, the peripheral wall 88 has a rear wall 90, a left wall 92, and a right wall 94, which correspond respectively to the rear wall 44, the left wall 46, and the right wall 48 of the base plate portion 32.

The rear wall 90 abuts the rear wall 44 of the base plate portion 32, and forms the rear end portion 10B of the disc cartridge 10. Further, a left inner wall 92A of the left wall 92 abuts the left inner wall 46A of the base plate portion 32, and a left outer wall 92B and a thin groove 92C of the left wall 92 oppose the left outer wall 46B and the thin groove 46C of the base plate portion 32, respectively. The left wall 92 forms the rear portion left side wall of the disc cartridge 10 and the rear portion of the first guide groove 12A.

The thin grooves 46C, 92C which oppose one another form a shutter guiding groove 96 into which a shutter pull-out portion 120 of the first shutter member 110 is inserted. The shutter guiding groove 96 (the thin groove 92C) communicates with the annular groove 68 in a vicinity of the front end portion of the left inner wall 92A. Namely, in a vicinity of the front end portion of the shutter guiding groove 96, the shutter guiding groove 96 is formed by the thin groove 46C of the base plate portion 32 and a portion of the annular groove 68 in a vicinity of the outer side wall opposing one another.

In the same way as the left wall 92, a right inner wall 94A of the right wall 94 abuts the right inner wall 48A of the base plate portion 32, and a right outer wall 94B opposes the right outer wall 48B of the base plate portion 32. The right wall 94 forms the rear portion right side wall of the disc cartridge 10 and the rear portion of the second guide groove 12B.

Further, cylinders 98 are provided at positions corresponding to the tubular projections 50 of the case plate portion 32, between the peripheral wall 88 and the annular groove 68. The cylinders 98 are at the same heightwise level as the rear wall 90 of the peripheral wall 88, and the bottom end surfaces thereof abut the top end surfaces of the tubular projections 50 of the base plate portion 32. A screw hole 98A is provided in the central portion of the cylinder 98. A screw, whose head portion engages with the screw receiving portion within the tubular projection 50 of the base plate portion 32, is screwed into the screw hole 98A from beneath, and the position of the hole 16 position regulation (the tubular projection 63) with respect to the top surface plate portion 34 is determined.

Further, due to the aforementioned screwing, the base plate portion 32 is connected and held in a state in which the top surface plate portion 34 covers the upper portion of the base plate portion 32, and the case 30 which rotatably houses the disc medium 20 is formed. In this state, the tubular wall 40 of the base plate portion 32 is inserted into the annular groove 68 of the top surface plate portion 34, and the peripheral wall 42 of the base plate portion 32 abuts a portion corresponding to the peripheral wall 88 of the top surface plate portion 34.

On the other hand, the bottom surface plate portion 36 is disposed beneath the base plate portion 32. The bottom surface plate portion 36 is formed such that the external configuration thereof is a flat shape which is substantially the same shape as that of the flat plate portion 64 of the top surface plate portion 34. Due to the outer periphery of the bottom surface plate portion 36 being slightly smaller than that of the flat plate portion 64, the bottom surface plate portion 36 can fit together with the inner peripheral surfaces of the outer wall 70 of the top surface plate portion 34 and the peripheral wall 42 (the rear wall 44, the left outer wall 46B, the right outer wall 48B) of the base plate portion 32.

An opening 100, which is of substantially the same configuration as the opening 54 of the base plate portion 32, is formed in the bottom surface plate portion 36 at a position corresponding to the opening 54. Namely, the opening 100 is formed by a hub hole 102 which corresponds to the hub hole 56, and a window portion 104 for a recording/playback head and right and left widened portions 104A, 104B which correspond to the window portion 58 for a recording/playback head. The opening 100 forms the opening 14 of the disc cartridge 10.

Through holes 106, which correspond to the outer diameters of the tubular projections 63 of the base plate portion 32, are provided in the bottom surface plate portion 36 at positions corresponding to the tubular projections 63. In the state in which the tubular projections 63 of the base plate portion 32 are inserted through the through holes 106 and the top surface of the bottom surface plate portion 36 is abutted by the bottom surface 38B of the base plate portion 32 (the portion other than the concave portion 38C) and the inner walls 80A, 80B of the top surface plate portion 34, the bottom surface plate portion 36 is fit with and held by the peripheral wall 42 (the rear wall 44, the left outer wall 46B, the right outer wall 48B) of the base plate portion 32 and the inner peripheral surface of the outer wall 70 of the top surface plate portion 34.

In this way, the region beneath the case 30, which accommodates the disc medium 20, is covered by the bottom surface plate portion 36. The front end portion 10A, the rear end portion 10B, the first guide groove 12A, the second guide groove 12B, and the two holes 16 for position regulation of the disc cartridge 10 are provided, as described above, in the case 30 whose lower region is covered. In addition, the opening 14 of the disc cartridge 10, at which the opening 54 of the base plate portion 32 and the window portion 78 of the top surface plate portion 34 and the opening 100 of the bottom surface plate portion 36 communicate, is formed in the case 30.

A shutter mechanism is provided in the case 30. The opening 14 is closed or opened by the shutter mechanism.

When the respective structural elements of the shutter mechanism are described hereinafter by using the front-back and left-right directions, explanation is basically based on the directions in the state in which the opening 14 is closed.

The shutter mechanism is equipped with the first shutter member 110. The first shutter member 110 is provided with the shutter main body 112 which mainly closes the window portion 58 for a recording/playback head of the base plate portion 32. The shutter main body 112 is formed by a resin member, a metal plate, or the like, and is formed by a thin, flat plate which is shaped such that a substantial trapezoid as seen in plan view (i.e., a rectangle whose front-back dimension is substantially equal to the radius of the tubular wall 40 of the base plate portion 32 and whose transverse dimension is slightly greater than the transverse dimension of the window portion 58 for a recording/playback head) has a front end portion which is formed in a circular-arc shape corresponding to the tubular wall 40 and has a rear right corner portion which is cut-out diagonally.

The thickness of the shutter main body 112 is smaller than the height of the base plate portion 32 from the bottom surface 38B to the concave portion 38C (the top surface of the bottom surface plate portion 36). The end surface (see FIGS. 2 through 4) of the slanted side portion of the shutter main body 112 is an abutment portion 112A with the second shutter member 150. A presser piece 112B, which stands erect, directed upwardly, is provided at the rear left corner portion of the shutter main body 112. The presser piece 112B is for pressing the second shutter member 150.

The circular-arc-shaped guide wall portion 118 stands upright, directed upwardly, integrally at the front end portion of the shutter main body 112. The circular-arc-shaped guide wall portion 118 which slides along the outer peripheral surface of the tubular wall 40 of the base plate portion 32 and which closes a portion (the cut-out portion of the front portion of the tubular wall 40) of the window portion 58 for a recording/playback head of the base plate portion 32. As seen in plan view, the inner peripheral surface of the circular-arc-shaped guide wall portion 118 is formed to curve in a circular-arc shape corresponding the outer peripheral surface of the tubular wall 40. The height of the circular-arc-shaped guide wall portion 118 is determined such that the heightwise level of the top end portion in the assembled state corresponds to the top end surface of the tubular wall 40 (see FIG. 8A).

At the circular-arc-shaped guide wall portion 118, a jutting-out portion 118A, which juts out toward the left of the shutter main body 112, is short, and a jutting-out portion 118B, which juts out toward the right, is long. A window portion 118C, whose bottom is cut-out in a substantial rectangular shape and open, is provided in the jutting-out portion 118B which juts out toward the right. The window portion 118C corresponds to the window portion 78 of the top surface plate portion 34. The dimensions of the respective portions are determined such that, in the state in which the opening 14 is open due to the shutter mechanism, this window portion 118C is positioned at the front.

Figure 8A:
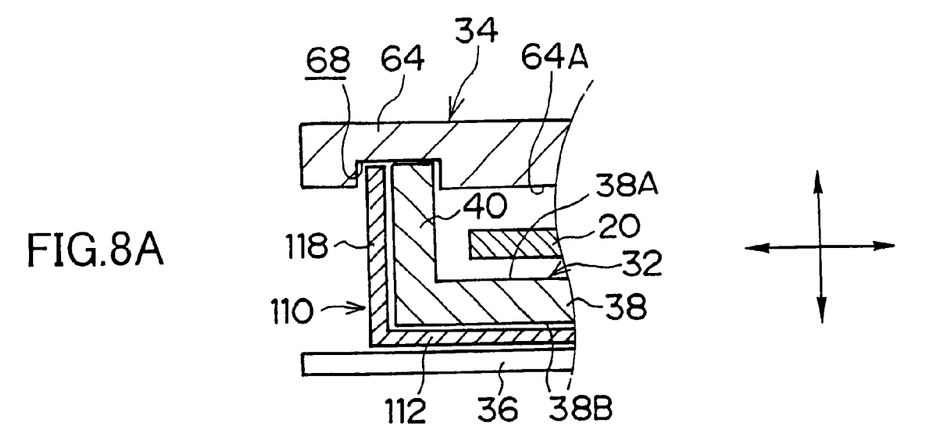
FIG. 8A is a cross-sectional view showing the structure of a front end portion of the disc cartridge relating to the present invention.
Figure 8B:
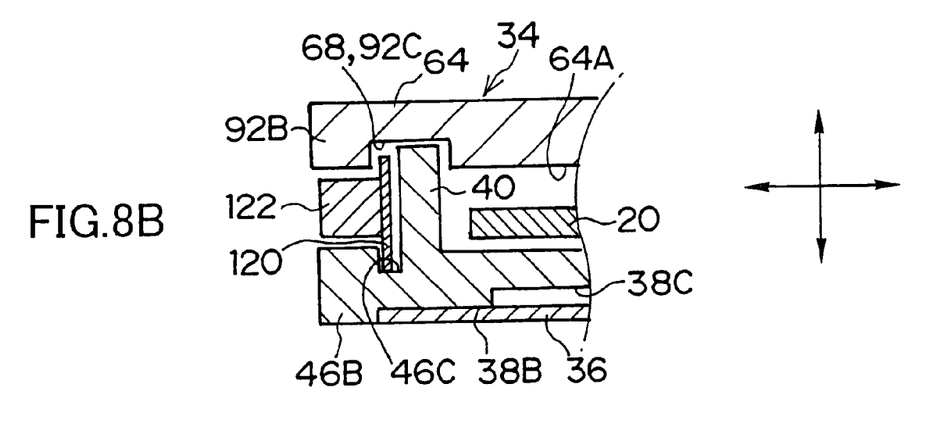
FIG. 8B is a cross-sectional view showing the structure of a left wall portion of the disc cartridge relating to the present invention.

The shutter pull-out portion 120 is connected to the distal end portion of the jutting-out portion 118A which juts out to the left of the circular-arc-shaped guide wall portion 118. The shutter pull-out portion 120 is formed in a thin plate shape which is sufficiently thinner than the circular-arc-shaped guide wall portion 118 and which is elastically deformable in the thickness direction. The shutter engaging portion 122 which is formed in the shape of a small block, is mounted to the distal end portion of the shutter pull-out portion 120. As shown in FIG. 8B, the transverse dimensions, in the vertical direction, of the shutter pull-out portion 120 and the shutter engaging portion 122 correspond to the vertical dimension of the shutter guiding groove 96 and the vertical dimension of the first guide groove 12A, respectively.

Figure 4:
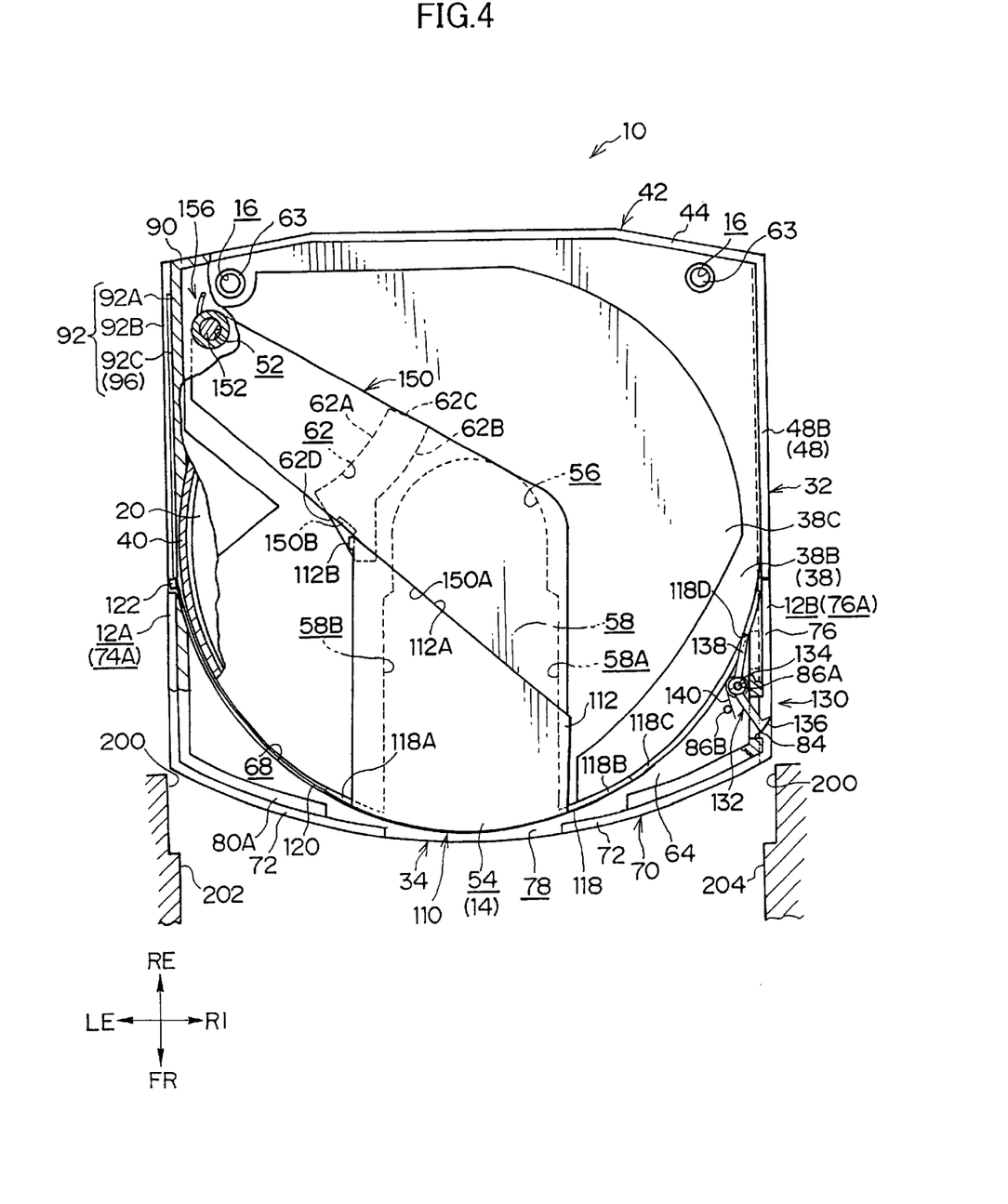
FIG. 4 is a bottom view, in which a bottom surface plate portion as well as a portion are cut-out, showing the entire structure, in a state in which an opening is closed, of the disc cartridge relating to the present invention.

Further, as shown in FIGS. 4 (a bottom view in which the bottom surface plate is cut-out) and 8A, in a state in which the circular-arc-shaped guide wall portion 118 is, together with the tubular wall 40 of the base plate portion 32, inserted into the annular groove 68 of the top surface plate portion 34 and is disposed slidably along the outer peripheral portion of the tubular wall 40, the shutter main body 112 of the first shutter member 110 is disposed between the concave portion 38C of the base plate portion 32 and the top surface of the bottom surface plate portion 36, and usually, a portion of the opening 14 (mainly, the window portion 58 for a recording/playback head) is closed.

In this state, the presser piece 112B of the shutter main body 112 is inserted into the shutter guiding hole 62 of the base plate portion 32, and is positioned at the front thereof. Further, in this state, the distal end portion of the shutter pull-out portion 120 is positioned at the front end portion of the shutter guiding groove 96 which communicates with the annular groove 68 of the top surface plate portion 34, and the shutter engaging portion 122 is positioned at the substantially central portion within the first guide groove 12A (at the rear of the left wall 74 of the top surface plate portion 34) and is exposed to the exterior. In this way, by moving the shutter engaging portion 122 rearward from the exterior, the circular-arc-shaped guide wall portion 118 is slid along the outer peripheral surface of the tubular wall 40 via the shutter pull-out portion 120, and the shutter main body 112 is rotated (see FIGS. 4 through 7).

Further, the shutter mechanism is provided with a locking means 130 for regulating the rotation of the first shutter member 110. The locking means 130 is provided with the lock lever 132 which is substantially V-shaped in plan view. The lock lever 132 is formed by a supporting shaft 134, the lock releasing lever 136, and the lock claw 138. The supporting shaft 134 which is positioned in a center portion is supported so as to be freely rotatable in the shaft hole 86A of the top surface plate portion 34. The lock releasing lever 136 is provided at one end portion of the lock lever 132, and projects from the lock releasing lever hole 84 into the second guide groove 12B (the lateral groove 76A). The lock claw 138 is provided at the other end portion of the lock lever 132 and can engage with a right end edge portion 118D of a window portion 118C which is provided at the jutting-out portion 118B which juts out toward the right of the shutter main body 112.

One end portion of a torsion spring 140 is anchored on the supporting shaft 134 of the lock lever 132, and the other end portion of the torsion spring 140 is engaged with the protrusion 86B of the top surface plate portion 34. In this way, the lock claw 138 is urged by the torsion spring 140 in the direction of engaging with the right end edge portion 118D of the window portion 118C which is provided at the jutting-out portion 118B of the shutter main body 112, and the lock lever 132 usually maintains the closed state of the opening 14.

On the other hand, when the lock releasing lever 136 is pushed rearward, the lock lever 132 rotates around the supporting shaft 134 against the urging force of the torsion spring 140, and the engaged state of the lock claw 138 and the right end edge portion 118D of the window portion 118C which is provided at the jutting-out portion 118B of the shutter main body 112 is cancelled.

Further, the shutter mechanism is provided with the second shutter member 150 which mainly closes the hub hole 56 of the base plate portion 32. The second shutter member 150 is formed by a resin member or a metal plate or the like. As seen in plan view, the second shutter member 150 is formed by a thin flat plate which is substantially trapezoidal (a trapezoid in which the parallel segments positioned at the left and right are offset and the space between the parallel segments is long). The thickness of the second shutter member 150 is the same as that of the shutter main body 112 of the first shutter member 110.

The end surface of the inclined side portion of the front end of the second shutter member 150 is an abutment portion 150A which abuts the abutment portion 112A of the shutter main body 112 of the first shutter member 110. The pressed piece 150B stands upright, directed upwardly (into the case 30) at the position of the abutment portion 150A which position corresponds to the pressing piece 112B of the shutter main body 112. The pressed piece 150B corresponds to the circular-arc portion of the shutter guiding hole 62 of the base plate portion 32. The widthwise dimension of the pressed piece 150B is such that the pressed piece 150B always abuts the pressing piece 112B within the range of rotation of the shutter main body 112 (the range of movement of the pressing piece 112B which is regulated at the shutter guiding hole 62).

The second shutter member 150 is provided with a rotation shaft 152 which stands upright, directed upwardly, at the rear right end portion of the second shutter member 150. The rotation shaft 152 corresponds to the shutter shaft hole 52 of the base plate portion 32. A slit 154 is formed at the top end portion of the rotation shaft 152. This second shutter member 150 is disposed between the concave portion 38C of the base plate portion 32 and the top surface of the bottom surface plate portion 36, in a state in which the rotation shaft 152 is inserted through the shutter shaft hole 52 of the base plate portion 32 and the pressed piece 150B is inserted in the shutter guiding hole 62. In this state, one end portion of the torsion spring 156 is anchored in the slit 154 of the rotation shaft 152, and the other end portion of the torsion spring 156 is anchored on the spring holding portion 53 of the base plate portion 32. The second shutter member 150 is thereby usually urged in a direction of abutting the first shutter member 110.

In this way, the abutment portion 150A of the second shutter member 150 usually is in a state of abutting the abutment portion 112A of the first shutter member 110, and in this state, the second shutter member 150 mainly closes the hub hole 56 of the base plate portion 32. Namely, as shown in FIG. 1B, the first shutter member 110 and the second shutter member 150 usually close the opening 14 of the disc cartridge 10, with the abutment portions 112A, 150A abutting each other.

In this state, the pressing piece 112B of the first shutter member 110 and the pressed piece 150B of the second shutter member 150 are respectively engaged with the inner edge of the front portion of the shutter guiding hole 62 of the base plate portion 32, and the state of abutment of the abutment portions 112A, 150A is maintained.

Next, to describe the operation of the disc cartridge 10, at the disc cartridge 10 having the above-described structure, at the time when the disc medium 20 is not being used, the opening 14 is closed by the first shutter member 110 and the second shutter member 150. Namely, as shown in FIG. 4, the abutment portion 112A of the first shutter member 110 and the abutment portion 150A of the second shutter member 150 match abut) one another. The first shutter member 110 mainly closes the window portion 58 for a recording/playback head of the base plate portion 32, and the second shutter member 150 mainly closes the hub hole 56 of the base plate portion 32.

At this time, due to the lock claw 138 of the locking means 130 engaging with the right end edge portion 118D of the window portion 118C which is provided at the jutting-out portion 118B of the shutter main body 112, rotation of the first shutter member 110 in the direction of opening the opening 14 is regulated, and the aforementioned closed state is maintained. The second shutter member 150 is urged in the direction of abutting the first shutter member 110 by the torsion spring 156, and the aforementioned closed state is maintained. In this way, entry of dust into the disc cartridge 10 when the disc medium 20 is not in use, i.e., adhesion of dust onto the bottom surface 24 of the disc medium 20, is prevented.

When the disc medium 20 is to be used (when information is to be recorded onto the disc medium 20 or information recorded on the disc medium 20 is to be played back), the disc cartridge 10 is loaded into the drive device. When the disc cartridge 10 is loaded into the drive device, the disc cartridge 10 is inserted into an insertion opening 200 (see FIGS. 4 through 7) of the drive device, with the front end portion 10A of the disc cartridge 10 leading.

Accompanying this insertion, guiding convex portions 202 and 204 of the drive device are inserted into the first guide groove 12A and the second guide groove 12B of the disc cartridge 10. The guiding convex portion 204, which is inserted into the second guide groove 12B, moves relatively toward the rear of the second guide groove 12B as the disc cartridge 10 is inserted further, and abuts the lock releasing lever 136 positioned within the second guide groove 12B, and pushes the lock releasing lever 136 rearward.

Figure 5:
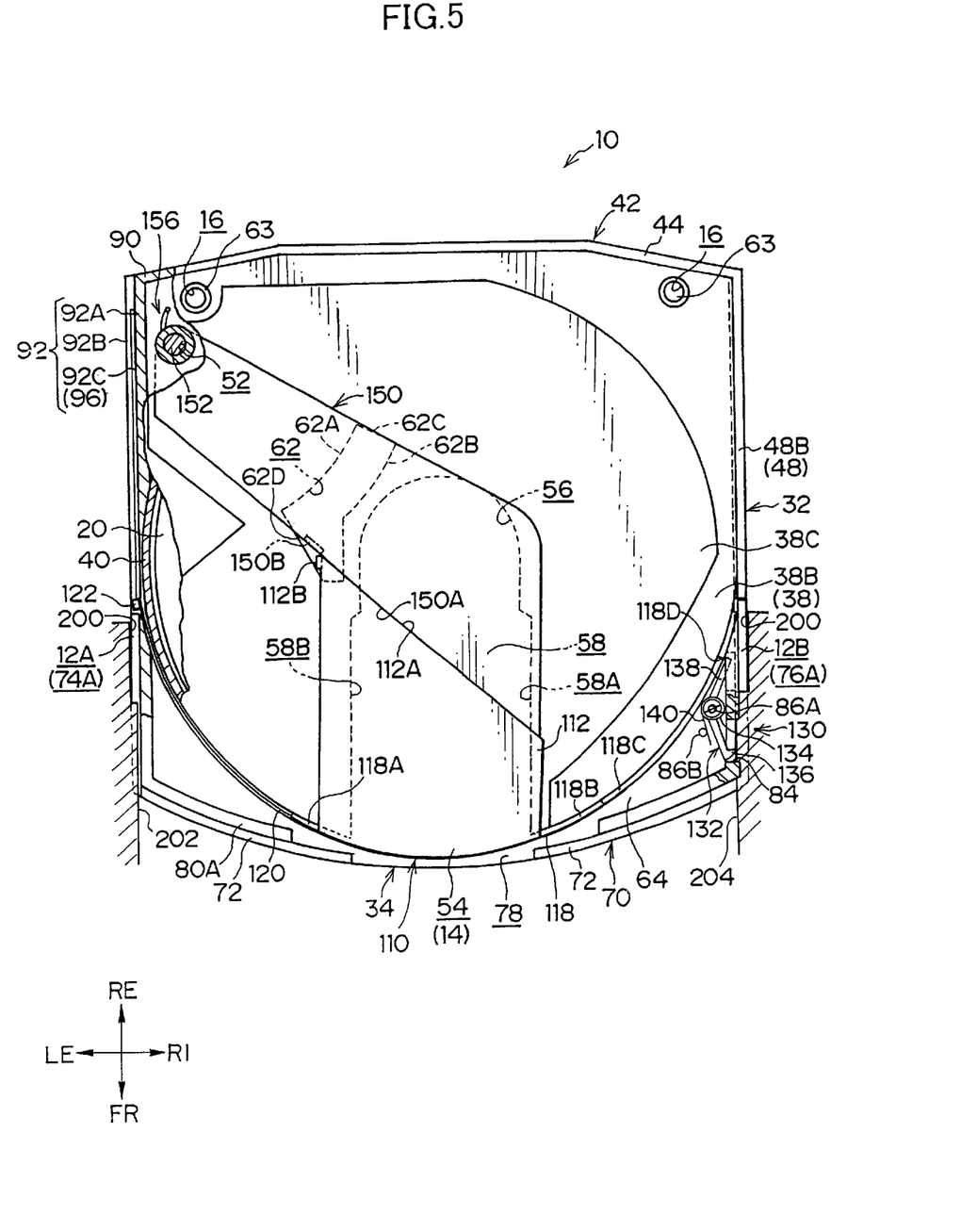
FIG. 5 is a view, corresponding to FIG. 4, showing a lock released state of the disc cartridge relating to the present invention.

When the lock releasing lever 136 is pushed rearward, as shown in FIG. 5, the lock lever 132 rotates around the supporting shaft 134 (the shaft hole 86A). The lock releasing lever 136 is withdrawn to within the lock releasing lever hole 84, and the engaged state of the lock claw 138 and the right end edge portion 118D of the window portion 118C which is provided at the jutting-out portion 118B of the shutter main body 112 is cancelled. In this way, the locked state of the first shutter member 110 is cancelled, and the first shutter member 110 rotates freely.

Figure 6:
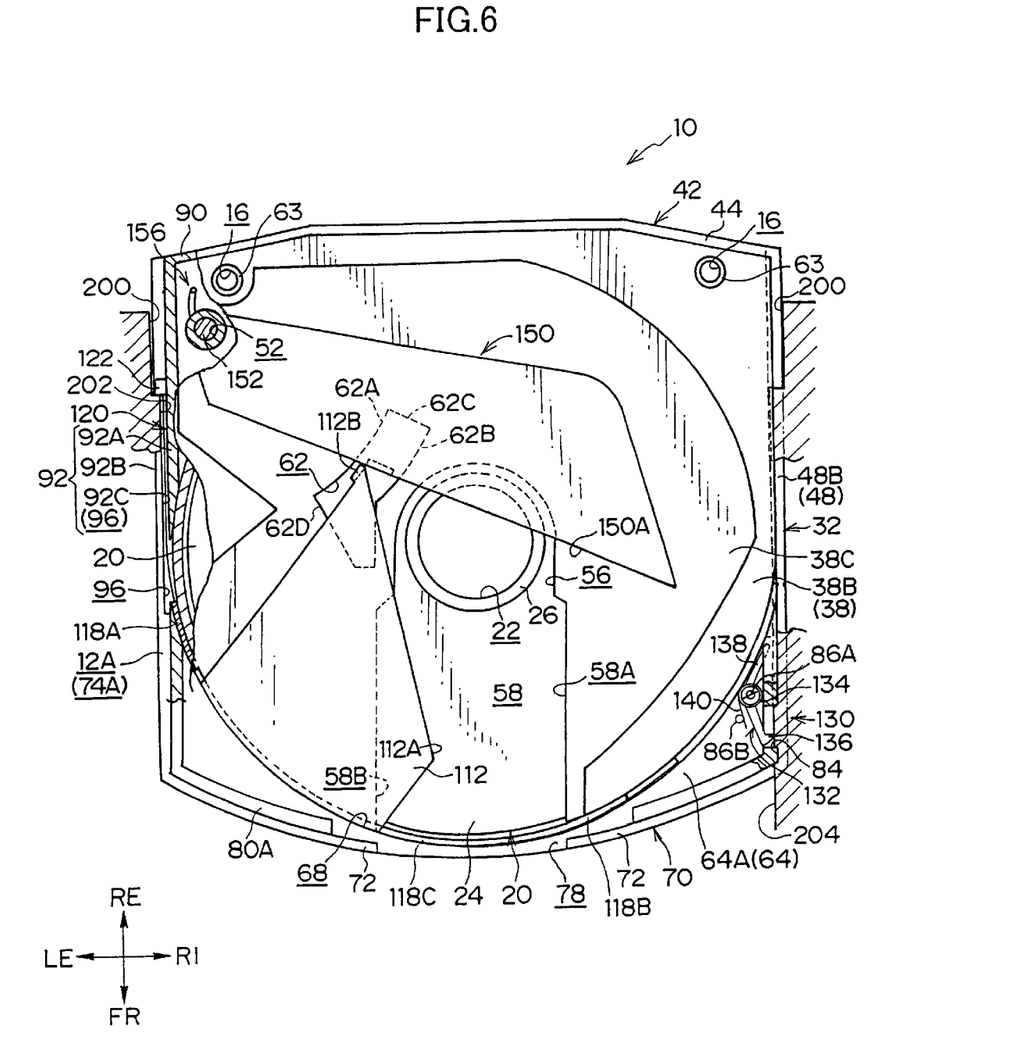
FIG. 6 is a view, corresponding to FIG. 4, showing a process of opening the opening of the disc cartridge relating to the present invention.

When the guiding convex portion 202 of the drive device moves relatively rearward within the first guide groove 12A, the guiding convex portion 202 engages with the shutter engaging portion 122 positioned within the first guide groove 12A, and pushes the shutter engaging portion 122 rearward. When the shutter engaging portion 122 is pushed rearward, as shown in FIG. 6, the first shutter member 110, whose locked state has been cancelled, rotates.

Namely, as the shutter engaging portion 122 moves rearward, the shutter pull-out portion 120 moves rearward in the shutter guiding groove 96 which extends in a tangential direction of the tubular wall 40. The circular-arc-shaped guide wall portion 118 thereby rotates while sliding along the outer peripheral surface of the tubular wall 40. As the circular-arc-shaped guide wall portion 118 rotates, the shutter main body 112, which is integral therewith, rotates along the tubular wall 40 (around the axial center of the tubular wall 40).

Then, as the first shutter member 110 rotates, the pressing piece 112B of the shutter main body 112 moves substantially rearward within the shutter guiding hole 62. Namely, the pressing piece 112B, which is provided so as to be separated from the axial center of the tubular wall 40, rotates around the axial center of the tubular wall 40. When the pressing piece 112B moves substantially rearward, the pressed piece 150B of the second shutter member 150, which is disposed so as to abut the pressing piece 112B, moves along the circular-arc-shaped portion of the shutter guiding hole 62 while being pressed substantially rearward. As the pressed piece 150B moves, the second shutter member 150 rotates around the rotation shaft 152 in a direction of moving away from the first shutter member 110 against the urging force of the torsion spring 156.

Figure 7:
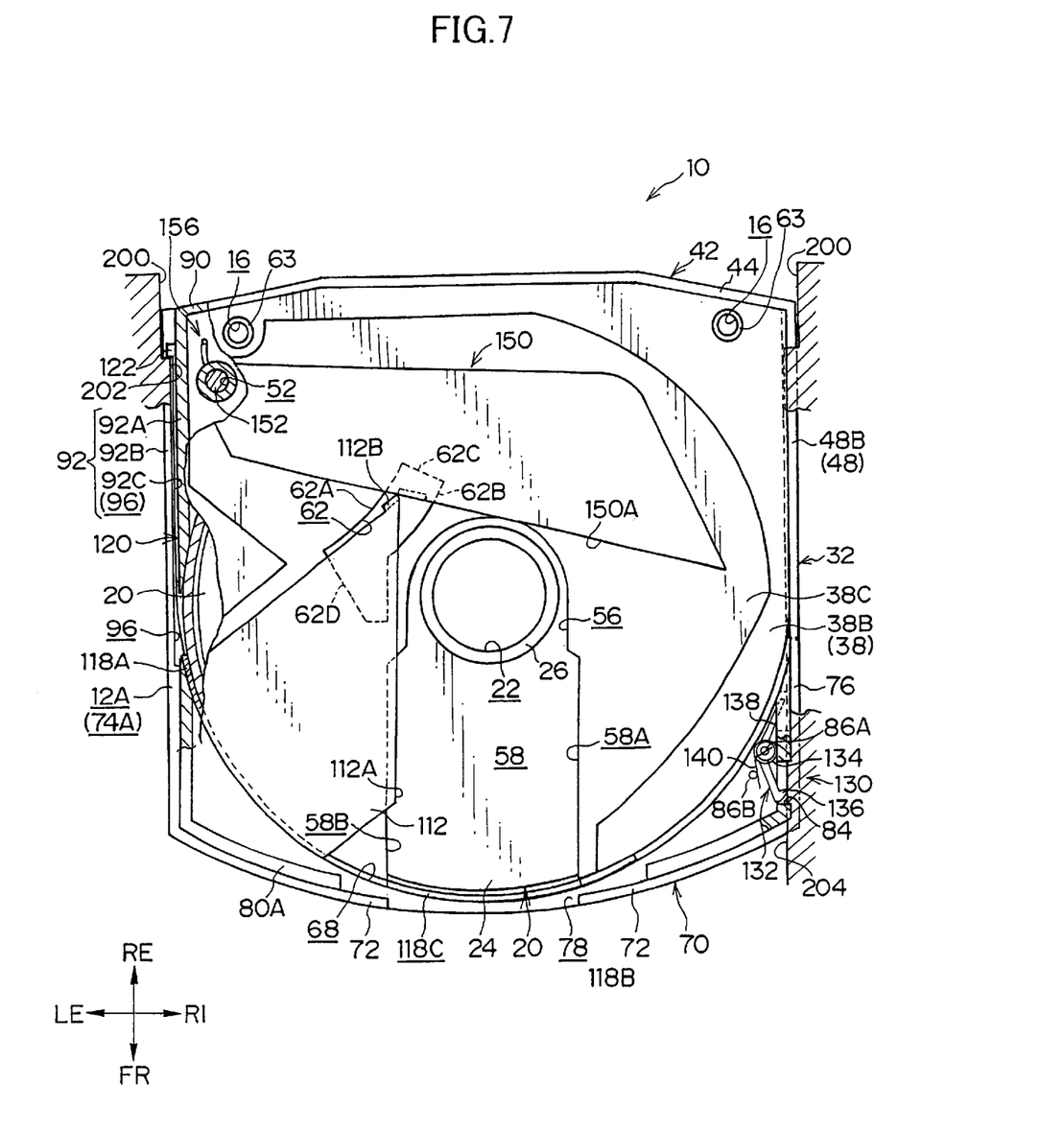
FIG. 7 is a view, corresponding to FIG. 4, showing an open state of the opening of the disc cartridge relating to the present invention.

When the guiding convex portion 202 of the drive device moves relatively and further rearward within the first guide groove 12A while engaging with the shutter engaging portion 122 (while pushing the shutter engaging portion 122 rearward), as shown in FIG. 7, the first shutter member 110 (the shutter main body 112 and the circular-arc-shaped guide wall portion 118) and the second shutter member 150 rotate further, and the window portion 58 for a recording/playback head and the hub hole 56 are opened. In this state, the window portion 118C of the circular-arc-shaped guide wall portion 118 is positioned at the front portion of the disc cartridge 10, and the front of the window portion 58 for a recording/playback head also is open through the window portion 78 of the top surface plate portion 34. Namely, the opening 14 of the disc cartridge 10 is opened.

As described above, due to the first shutter member 110 and the second shutter member 150 moving (rotating) in respectively different directions while the abutment portions 112A, 150A thereof move away from each other, the large opening 14 of the disc cartridge 10 can be opened while the area over which the shutters move is small.

Further, when the disc cartridge 10 is inserted to a predetermined position of the drive device, the positioning mechanism of the drive device is inserted into the holes 16 for position regulation, and the disc cartridge 10 is accurately positioned. In this way, the disc cartridge 10 cannot be inserted any further, and closing of the opening 14 due to the urging force of the torsion spring 156 and movement in the direction of discharging the disc cartridge 10 (movement toward the insertion opening 200 side) are prevented.

In this state, the rotation spindle shaft is inserted from a portion corresponding to the hub hole 56 of the opening 14 whose closed state has been canceled. At the distal end portion of the rotation spindle shaft, the rotation spindle shaft holds the center core portion 26 of the disc medium 20 by engagement or suction or the like, and rotates the disc medium 20 around the axial center. Further, a recording/playback head is inserted from a portion corresponding to the window portion 58 for a recording/playback head of the opening 14. Information is recorded onto the recording surface of the disc medium 20 or information recorded on the recording surface is played back.

On the other hand, when the disc cartridge 10 is to be discharged from the drive device, the positioning mechanism is removed from the holes 16 for position regulation, and movement in the discharging direction (movement toward the insertion opening 200 side) becomes possible. In this state, due to the urging force of the torsion spring 156 or the discharging direction pressing force applied by the drive device, the disc cartridge 10 is moved with the rear end portion 10B thereof leading. Accompanying this movement, while the guiding convex portion 202 of the drive device is engaged with the shutter engaging portion 122, the pressing force via this guiding convex portion 202 is no longer applied, and the first shutter member 110 is set in a state in which rotation is possible.

In this state, while the disc cartridge 10 moves in the discharging direction as described above, the opening 14 is closed. Namely, due to the urging force of the torsion spring 156, the second shutter member 150 rotates in the direction of closing the opening 14 while, at the pressed piece 150B, pressing the pressing piece 112B of the first shutter member 110 substantially forward. Further, the first shutter member 110 which is pressed substantially forward at the pressing piece 112B rotates in the direction of closing the opening 14 due to this pressing.

When the first shutter member 110 and the second shutter member 150 respectively rotate and return to their initial positions, the opening 14 is closed. The pressing piece 112B of the first shutter member 110 which has returned to its initial position engages with the inner edge of the front portion of the shutter guiding hole 62. Further rotation, due to the urging force of the torsion spring 156, of the first shutter member 110 and the second shutter member 150, which abuts the pressing piece 112B at the pressed piece 150B, is prevented.

Rotation of the first shutter member 110 and the second shutter member 150 past their initial positions may be prevented by the pressed piece 150B of the second shutter member 150 being made to engage the peripheral edge portion of the shutter guiding hole 62 at the initial position. Or, rotation may be prevented by the distal end portion of the jutting-out portion 118B of the circular-arc-shaped guide wall portion 118 of the first shutter member 110 being made to engage the widened end portion of the annular groove 68 at the initial position.

When the disc cartridge 10 is moved further in the discharging direction and the guiding convex portion 204 is moved to a position further forward than the lock releasing lever hole 84 of the second guide groove 12B, due to the urging force of the torsion spring 140, the lock lever 132 rotates. The lock releasing lever 136 projects into the second guide groove 12B, and the lock claw 138 engages with the right end edge portion 118D of the window portion 118C which is provided at the jutting-out portion 118B of the shutter main body 112. In this way, the disc cartridge 10 returns to the state before loading into the drive device, rotation of the first shutter member 110 is prevented, and the closed state of the opening 14 is maintained.

In the above-described embodiments, the disc medium 20 is a single-side recording type, and the opening 14 is provided at the bottom side (including the front side). However, the present invention is not limited to the same. For example, the disc medium 20 may be a both-sides recording type in which the opening 14 is provided at the top side as well, and shutter members which open and close the top and bottom openings may be respectively provided. Further, the opening 14 is not limited to the structure in which the hub hole 56 and the window portion 58 for a recording/playback head are connected, and the hub hole 56 and the window portion 58 for a recording/playback head may of course be formed separately.

As described above, in the present invention, the lock lever 132, which locks the first shutter member 110 such that the first shutter member does not move, and the shutter engaging portion 122, which moves the first shutter member 110, are separately provided at the first guide groove 12A and the second guide groove 12B. Accordingly, at a time of non-use of the disc medium, the movement of the first shutter member 110 can be regulated by the lock lever 132. Further, in order to open the opening intentionally, the lock lever 132 which is for the side of the second guide groove 12B and the shutter engaging portion 122 which is for the side of the first guide groove 12A are both operated at the same time. Accordingly, operation of opening the shutter portion is not facile. Accordingly, it can be prevent that the opening is opened inadvertently.

Further, because the lock claw 138 of the lock lever 132 is engage with end edge portion 118D of the window portion 118C which is provided at the first shutter member 110, it is not necessary that another engaged portion or the like for engaging with the lock claw 138 is provided at the first shutter member. Accordingly, the cost does not increase.

As mentioned above, in order to open the opening intentionally, the operating portion of the lock mechanism and the activating portion for opening and closing operation of the shutter portion are operated at the same time. however, in accordance with the present invention, the operating portion and the activating portion are provided in the respective different groove portions, therefore, operation of opening the shutter member is not facile. Accordingly, it can be prevent that the opening is opened inadvertently.

What is claimed is:

1. A disc cartridge having a shutter portion which can open and close an opening for access to a disc-shaped disc medium, the opening being formed in at least one surface of a case which rotatably accommodates the disc medium, wherein two groove portions are provided at outer wall surfaces of the case, and an operating portion of a lock mechanism for the shutter portion is provided in one of the groove portions, and an activating portion for opening and closing operation of the shutter portion is provided in another of the groove portions.

2. A disc cartridge according to claim 1, wherein the operating portion is accommodated in one of the groove portions, and the activating portion is accommodated in the other of the groove portions.

3. A disc cartridge having a shutter portion which can open and close an opening for access for a disc-shaped disc medium the opening being formed in at least one surface of a case which rotatably accommodates the disc medium, said disc cartridge comprising:

a first groove portion which is formed on a first side wall of the case;

a second groove portion which is formed on a second side wall of the case;

a lock portion which regulates movement of the shutter portion; and an activating portion for moving the shutter portion, wherein, the activating portion protrudes from the first groove, and an operating portion of the lock portion protrudes from the second groove.

4. A disc cartridge according to claim 3, wherein a protruding portion which protrudes from the second groove is formed at one end portion of the operating portion, and an engaging portion for engaging with the shutter portion is formed at another end portion of the operating portion.

5. A disc cartridge according to claim 4, wherein the shutter portion comprises a first shutter member and a second shutter member, and the activating portion is provided at one end portion of the first shutter member and an engaged portion which is engaged with the engaging portion of the lock portion is provided at another end of the first shutter member.

6. A disc cartridge according to claim 3, wherein the activating portion is accommodated in the first groove, and the operating portion is accommodated in the second groove.

7. A disc cartridge having a shutter portion which can open and close an opening for access to a disc-shaped disc medium, the opening being formed in at least one surface of a case which rotatably accommodates the disc medium, said disc cartridge comprising:

a first groove portion which is formed on one of wall surfaces of the case;

a second groove portion which is formed on another of the wall surfaces of the case;

a lock portion which regulates movement of the shutter portion; and an activating portion for moving the shutter portion, wherein, the activating portion protrudes from the first groove, and an operating portion of the lock portion protrudes from the second groove, and wherein the first groove portion and the second groove portion are formed respectively at side walls, which oppose each other, of the case.

8. A disc cartridge having a shutter portion which can open and close an opening for access to a disc-shaped disc medium, the opening being formed in at least one surface of a case which rotatably accommodates the disc medium, wherein two groove portions are provided at wall surfaces of the case, and an operating portion of a lock mechanism for the shutter portion is provided in one of the groove portions, and an activating portion for an opening and closing operation of the shutter portion is provided in another of the groove portions, wherein the first groove portion and the second groove portion are formed respectively at side walls, which oppose each other, of the case.

* * * * *